(12) United States Patent
Curtin et al.

(10) Patent No.: US 8,446,883 B2
(45) Date of Patent: May 21, 2013

(54) METHOD AND APPARATUS FOR ENABLING NETWORKED OPERATIONS IN VOICE RADIO SYSTEMS

(75) Inventors: Michael Thomas Curtin, Melbourne, FL (US); Dale Edward Burton, Melbourne, FL (US)

(73) Assignee: Northrop Grumman Corporation, Falls Church, VA (US)

( * ) Notice: Subject to any disclaimer, the term of this patent is extended or adjusted under 35 U.S.C. 154(b) by 758 days.

(21) Appl. No.: 12/561,085

(22) Filed: Sep. 16, 2009

(65) Prior Publication Data
US 2011/0064022 A1    Mar. 17, 2011

(51) Int. Cl.
*H04B 7/216* (2006.01)
*H04W 4/00* (2009.01)

(52) U.S. Cl.
USPC .......................................................... 370/335

(58) Field of Classification Search .................. 370/335, 370/328; 888/335, 328
See application file for complete search history.

(56) References Cited

U.S. PATENT DOCUMENTS

| 6,418,147 | B1 * | 7/2002 | Wiedeman ..................... 370/468 |
|---|---|---|---|
| 6,590,880 | B1 | 7/2003 | Maenpaaet et al. |
| 2004/0032843 | A1 | 2/2004 | Schaefer et al. |
| 2004/0103204 | A1 * | 5/2004 | Yegin ........................... 709/229 |
| 2005/0020294 | A1 | 1/2005 | Kantola |
| 2005/0232241 | A1 | 10/2005 | Wu et al. |
| 2006/0120350 | A1 * | 6/2006 | Olds et al. ..................... 370/352 |
| 2007/0152814 | A1 * | 7/2007 | Stefani ..................... 340/539.22 |
| 2007/0282748 | A1 * | 12/2007 | Saint Clair et al. ............. 705/51 |
| 2008/0032728 | A1 * | 2/2008 | Patel et al. .................... 455/518 |
| 2008/0247361 | A1 | 10/2008 | Jung et al. |
| 2009/0004996 | A1 * | 1/2009 | Peleg et al. ................... 455/403 |
| 2009/0073944 | A1 * | 3/2009 | Jiang et al. ................... 370/338 |
| 2009/0180421 | A1 * | 7/2009 | Hall et al. ..................... 370/316 |
| 2010/0254395 | A1 * | 10/2010 | Smith et al. .................. 370/401 |
| 2011/0250914 | A1 * | 10/2011 | Arlotta .......................... 455/508 |

OTHER PUBLICATIONS

Handset Radio Control Handset (RA250 Series) www.swatheadsets.com (undated).
AN/PRC-77 Tactical Radio Set, Associated Industries, (undated).

* cited by examiner

*Primary Examiner* — Mark Rinehart
*Assistant Examiner* — Angel Brockman
(74) *Attorney, Agent, or Firm* — Stetina Brunda Garred & Brucker

(57) ABSTRACT

A method and system for the networking of radio transceivers is disclosed. The system includes a source transceiver with a source address, and a destination transceiver with a destination address. A router gateway includes a first interface in communication with the source transceiver and a second interface in communication with the destination transceiver, and interconnections between the two are defined in a routing table. A network signaling system independent of the respective radio transmission and receipt systems enables communication between the source transceiver and the destination transceiver.

25 Claims, 5 Drawing Sheets

METHOD AND APPARATUS FOR ENABLING NETWORKED OPERATIONS IN VOICE RADIO SYSTEMS

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates generally to communications systems, and in particular, to voice radio networks and associated devices. The present invention also relates to methods for routing voice calls over radio networks.

2. Related Art

Modern warfare, which typically involves the execution of tactics requiring pinpoint accuracy, relies heavily on sophisticated telecommunications systems to relay critical information between command and control centers, combat units, combat support units and combat service support units. The coordination of military action is often complicated because many such units may be dispersed over a wide geographic area, some of which may be of different types or specialties (e.g., infantry, armor, artillery, etc.), from different service branches, or even from different nations. Because of this diversity, the deployed telecommunications systems in any given combat zone may likewise be varied due to preference and/or suitability for the particular mission of the unit, staggered upgrade schedules, and so forth.

Combat-Net Radio (CNR) is a system widely used for remote communications to interconnect each of the aforementioned battlefield units. More specifically, CNR employs half-duplex communications typically implemented as a push-to-talk network. The CNR transceivers operate on a single radio frequency, or in the alternative, on multiple frequencies in a predefined sequence according to a frequency-hopping mode to prevent jamming attempts.

One specific implementation of CNR is the Single Channel Ground and Airborne Radio System (SINCGARS) currently utilized by United States and allied military forces. SINCGARS transceivers are capable of handling both voice and data communications, and are available in various form factors, including vehicle-mount, backpack, airborne, and handheld. Per its designation as CNR, SINCGARS is a half-duplex communication system that utilizes either a single frequency or multiple frequencies when operating in a frequency-hopping mode. Specifically, the VHF (Very High Frequency) FM (Frequency Modulation) band, designated as between 30 MHz to 87.975 MHz, is utilized by SINCGARS transceivers in incremental 25 kHz channels. Alternatively, the VHF AM (Amplitude Modulation) band, designated as between 108 Mhz and 151.975 MHz can also be utilized. In many implementations, the voice and data traffic between transceivers are encrypted for increased security.

Prior to the widespread deployment of SINGARS, a more basic VHF FM CNR system known as the AN/PRC (Army-Navy Portable Radio Communication) was utilized in the battlefield for tactical communications. The AN/PRC operated on frequencies between 30 MHz and 75.95 MHz with 50 kHz channels. Thus, although incompatible with the frequency-hopping mode of SINCGARS, an AN/PRC transceiver operating in the single frequency mode can communicate with SINCGARS transceivers. Accordingly, it continues to be utilized by military forces worldwide despite its legacy status.

In contrast to the SINCGARS and predecessor VHF FM radio systems described above, "net ready" telecommunications systems such as Link-16 and CDMA cellular phone networks utilize digital transmissions to carry a wide variety of data. Link-16, for example, is capable of transferring imagery data, text messages, and two channels of digital voice at different QoS (Quality of Service) levels. The underlying radio network is a Time Division Multiple Access (TDMA) scheme operating in the UHF (Ultra High Frequency) spectrum of 969 MHz to 1206 MHz. Because of its support for high speed, content-agnostic data transfers over a single communications channel, an increasing number of military platforms such as fighters, attack and EWACS aircraft, helicopters, ships, ground vehicles and the like have Link-16 capabilities. As utilizing a single network eliminates the need to carry and maintain separate equipment for each type of information exchanged, such systems are increasingly favored.

As can be appreciated from the foregoing, numerous standards and technologies for wireless communications are currently used in the battlefield amongst combat units. Such communications systems are often incompatible with one another, and there is accordingly a need in the art for linking all such systems such that any given transceiver can communicate with any other transceiver.

BRIEF SUMMARY

In accordance with one embodiment of the present invention, a radio network system is disclosed. The system may include a source transceiver unit that has an assigned source address and a destination transceiver unit that similarly has an assigned destination address. Additionally, the system may include a router gateway. One feature of the router gateway may be a first interface that is in radio communication with the source transceiver unit. Another feature may be a second interface in radio communication with the destination transceiver unit. The router gateway may also include a routing table that defines an interconnection of the first interface to the second interface based upon the destination address. Furthermore, the system may include a network signaling framework that is abstracted from the radio communication level. Specifically, the router gateway, the source transceiver unit, and the destination transceiver unit may each include an encoder/decoder that is in compliance with such network signaling framework. The interconnection of the first interface and the second interface may be initiated with routing signals generated from and decoded by the encoder/decoders associated with respective ones of the source transceiver unit and the router gateway. The network signaling framework is understood to define routing signals.

According to another embodiment of the present invention, a radio network gateway for routing transmissions from a remote source transmitter to a remote destination receiver is provided. The gateway may include a plurality of source receivers. One of the source receivers may be in radio communication with the remote source transmitter. Additionally, the gateway may include a plurality of destination transmitters, in which a first one of the destination transmitters may be in communication with the remote destination receiver. The gateway may also include a routing path database that stores a destination address of the remote destination receiver associated with the first one of the plurality of destination transmitters in communication therewith. Moreover, the gateway may include a router having a selectable interconnection between the source receiver and the destination transmitter. The interconnection may be defined by the routing path database.

In yet another embodiment of the present invention, a method for radio communications is contemplated. The method may include establishing a first radio communication link between a first remote transceiver and a gateway. The method may also include transmitting to the gateway over the first radio communication link an encoded source transceiver output signal, including a predefined destination identifier, or destination address, and a message payload. The method also contemplates routing the message payload through the gateway to a transmitter designated as being associated with a second remote transceiver. The destination identifier may be assigned to the second remote transceiver. A step of establishing a second radio communication link between the gateway and the second remote transceiver may also be included in the method, as well as a step of transmitting the message payload to the second remote transceiver over the second radio communication link.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of the presently preferred embodiment of the invention, and is not intended to represent the only form in which the present invention may be developed or utilized. The description sets forth the functions of the invention in connection with the illustrated embodiment. It is to be understood, however, that the same or equivalent functions may be accomplished by different embodiments that are also intended to be encompassed within the scope of the invention. It is further understood that the use of relational terms such as first and second and the like are used solely to distinguish one from another entity without necessarily requiring or implying any actual such relationship or order between such entities.

Figure 1:
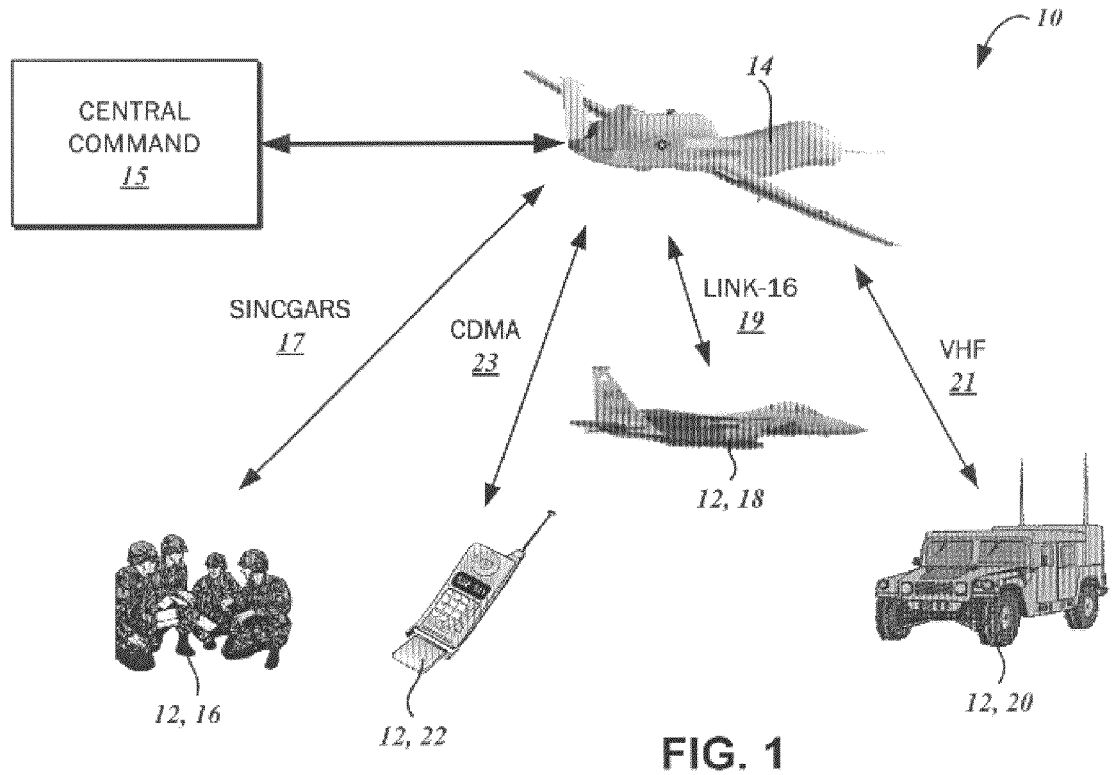
FIG. 1 is a block diagram illustrating a radio network system for various combat units deployed in a battlefield.

Referring to the block diagram of FIG. 1, a radio network system 10 deployed in a battlefield environment 5 provides communication capabilities to combat units 12. Each of the combat units 12 communicates with a command center 15, which may be linked via an Unmanned Aerial Vehicle (UAV) 14 such as the Northrop Grumman RQ-4 Global Hawk, which flies over the battlefield environment 5. Alternatively, the combat units 12 may communicate to the command center 15 via an exemplary gateway 14 included in, for example, an AEW&C (Airborne Early Warning and Control) aircraft. It will be recognized by those having ordinary skill in the art that any gateway may be utilized, and the gateway 14 is presented by way of example only and not of limitation. Such an intermediate relay to the command center 15 may be necessary because the telecommunications systems utilized in the radio network system 10 operates on the VHF and UHF frequency spectrum, which requires line-of-sight communications. It is understood, however, that the gateway 14 may be part of the command center 15.

In further detail, an infantry unit 16 may utilize a SINCGARS Combat-net Radio system 17, a fighter aircraft 18 may utilize a Link-16 telecommunications system 19, and a ground transport unit 20 may utilize a legacy AN/PRC VHF Combat-net radio system 21. Other miscellaneous units 22 may utilize a CDMA cellular telephone network 23. Collectively, these disparate telecommunication systems and their associated network connections will be referenced herein as communications interlinks. It will be appreciated by those having ordinary skill in the art that the above combat units 12 and the diverse communications interlinks being utilized thereby are presented by way of example only and not of limitation, and embodiments of the present invention are not limited to such specifics. The various combat units 12 may utilize any other known telecommunications system. Furthermore, it is expressly contemplated that the radio network system 10 also includes commercial entities, first responders, and the like, and are not intended to be limited to military applications.

As described above in the background, the SINCGARS Combat-net Radio system 17 and the AN/PRC VHF Combat-net radio system 21 are "non net ready," while the Link-16 telecommunications system 19 and the CDMA cellular telephone system 23 are "net ready." Regardless of its data networking capabilities, it is understood that each of the communication systems 17, 19, 21, and 23 deployed in the radio network system 10 is capable of at least carrying voice calls. In accordance with one embodiment, it is contemplated that voice calls are possible with other combat units across the various underlying telecommunications systems despite incompatibilities between such systems. The method for making and properly routing the voice calls across incompatible telecommunications systems is also contemplated, as detailed further below.

Figure 2:
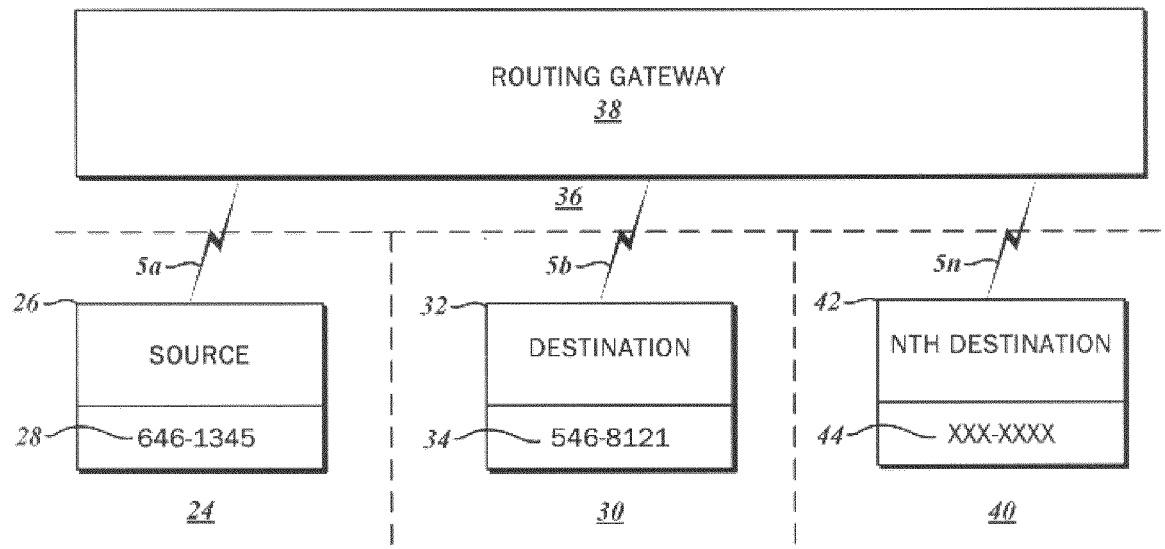
FIG. 2 is a detailed block diagram illustrating the components of a basic embodiment of the radio network system in accordance with one embodiment of the present invention.

FIG. 2 generally illustrates the components of the radio network system 10 in accordance with one embodiment of the present invention. In a first remote location 24, there is a source transceiver unit 26. In general, the terms "transceiver" and "transceiver unit" are interchangeably referenced as meaning a communications device utilized by the combat units 12. In some embodiments described hereafter, however, the "transceiver" may refer to a sub-component of the "transceiver unit." To the extent any such distinctions are intended, "transceiver" refers to the underlying radio transmission and reception device that, at the very least, modulates an audio signal according to the specified scheme for broadcast, and demodulates a radio signal according to the same specified scheme for reproduction as an audio signal. Further, it is understood that "transceiver unit" is understood to encompass a separate modality attached to or integrated with the "transceiver" that enables participation in the radio network system 10 of the present invention. Those of ordinary skill in the art will recognize from the context of the reference that the more general definition for both "transceiver" and "transceiver unit" applies, or that the specific definitions and distinctions above apply. Transceiver may encompass two-way communications devices, though a communications link could be receive-only or transmit-only.

In further detail, the source transceiver unit 26 has a source address 28 assigned thereto. By way of example only, the source address 28 is a seven-digit number ("646-1345") understood to be in the same 3+4 format utilized for telephone numbers in the United States. However, any other numbering scheme may be substituted, and the various parts of the source address 28 may be used to logically denote or segment the radio network 10 according to classes of transceivers thereon, geographic location, and so forth.

In a second remote location 30 there is a destination transceiver unit 32 with a destination address 34, also a seven-digit number in the 3+4 format ("546-8121"), assigned thereto. Notwithstanding the illustrated example having the same format as the source address, it is also understood that the format of the destination address may be different therefrom. When referring to the second remote location 30, it is understood that the term does not define any particular limits as to proximity or distance relative to the first remote location 24. In this regard, the source transceiver unit 26 may be located in the same general vicinity as the destination transceiver unit 32, or may be located miles away from each other, subject to the signal transmission distance limits thereof.

In a central location 36 away from the first and second remote locations 24, 30, there is a router gateway 38 that communicates with both the source transceiver unit 26 and the destination transceiver unit 32. More particularly, the source transceiver unit 26 communicates with the gateway 38 over a first communications link 5a, while the destination transceiver unit 32 communicates with the gateway 38 over a second communications interlink 5b. As a general matter, it is understood that the first, second, and Nth communications interlinks 5a, 5b, and 5n are wireless or radio broadcast signals, though it may also be a wired connection over landline telephone, Voice Over IP (VoIP) and the like.

An embodiment of the present invention contemplates the router gateway 38 effectively coupling the first communications link 5a to the second communications link 5b such that the destination transceiver unit 32 can receive information from the source transceiver unit 26. Furthermore, many other transceiver modules besides the first and second ones illustrated above may be connected to the radio network system. An exemplary configuration is further illustrated in FIG. 2 and denoted by the Nth destination transceiver unit 42 disposed in a Nth location 40 and having been assigned an Nth destination address 44. The Nth destination transceiver unit 42 communicates with the gateway 38 via the communications interlink 5n. The gateway 38 is thus understood to likewise enable communication to the similarly situated Nth destination transceiver unit 42. Where multiple transceivers are utilized in the radio network system 10 according certain embodiments of the present invention, it is contemplated that voice calls are routed only to the designated transceivers, by specifying the destination address.

It will be apparent to those of ordinary skill in the art that the various source and destination transceivers and the gateway of FIG. 2 correspond to the more generally illustrated radio network system 10 of FIG. 1. That is, the source transceiver unit 26 and the destination transceiver units 32, 42 generally correspond to the communications equipment utilized by the combat units 12, and the router gateway generally corresponds to the device that performs the role of the central command 15. Thus, it is contemplated that the first, second and Nth communications interlinks 5a, 5b, and 5n may be VHF FM AN/PRC, SINCGARS, Link-16 or CDMA cellular, as well as other wireless communication networks known in the art. Along these lines, the first communications link 5a may not be interoperable or compatible with the second communications link 5b or the Nth communications link 5n.

Having described the general components of the radio network 10, the contemplated method for radio communications in accordance with one embodiment of the present invention will be described in relation thereto, and with further reference to the flowchart of FIG. 3. Additional contemplated implementation details will also be provided, though it will be recognized that such details are presented by way of example only and not of limitation.

According to step 200, the method begins with establishing the first communications interlink 5a between the source transceiver unit 26 and the routing gateway 38. Because the first communications interlink 5a is based on a radio broadcast (by the source transceiver unit 26) and reception (by the routing gateway 38), it is understood to be a "stateless" connection in that at any particular point in time, neither the receiving end nor the transmitting end recognizes that a connection to the other end is active. Accordingly, as referenced herein, it is understood that establishing the first communications interlink 5a refers to the transmission of a signal, on one hand, and the receipt of that signal, on the other hand. For purposes of this step, it is understood that both the source transceiver unit 26 and the routing gateway 38 are operating on the same channel or frequency hopping sequence, as well as on the same modulation scheme. With respect to cellular or other telephone devices, however, the communications interlink 5 is understood not to be stateless. Bridging such connections may involve establishing conventional dedicated dial-up links.

As indicated above, one embodiment of the present invention contemplates that the source transceiver, i.e., the underlying transmission modality, is a push-to-talk radio. With reference to the signal sequence diagram of FIG. 4, establishing the first communications interlink 5a, may involve, for example, the assertion of Push To Talk (PTT) 300 at a first time instance 350 when the initial high signal is taken low. At the assertion of push-to-talk 300, also at a the first time instance 350, radio preambles 305 are sent, taking until a second time instance 355 to complete. The preamble 305 may be used to synchronize frequency hopping in systems and serve other such administrative functions well known in the art prior to the transmission of data. The assertion of push-to-talk 300 and the transmission of radio preambles 305 may involve signals that are generated from the source transceiver.

The operational principles set forth herein are understood to be applicable to the other transmission modalities noted above, including "net-ready" systems such as CDMA, Link-16, and the like. Those having ordinary skill in the art will recognize the appropriate modifications to various aspects of the embodiment of the present invention that attendant to such modalities. For example, instead of the assertions of push-to-talk and so forth, there may be an initiation of a telephone call to the gateway 14 where the communications is initiated over the CDMA cellular telephone network 23.

Figure 3:
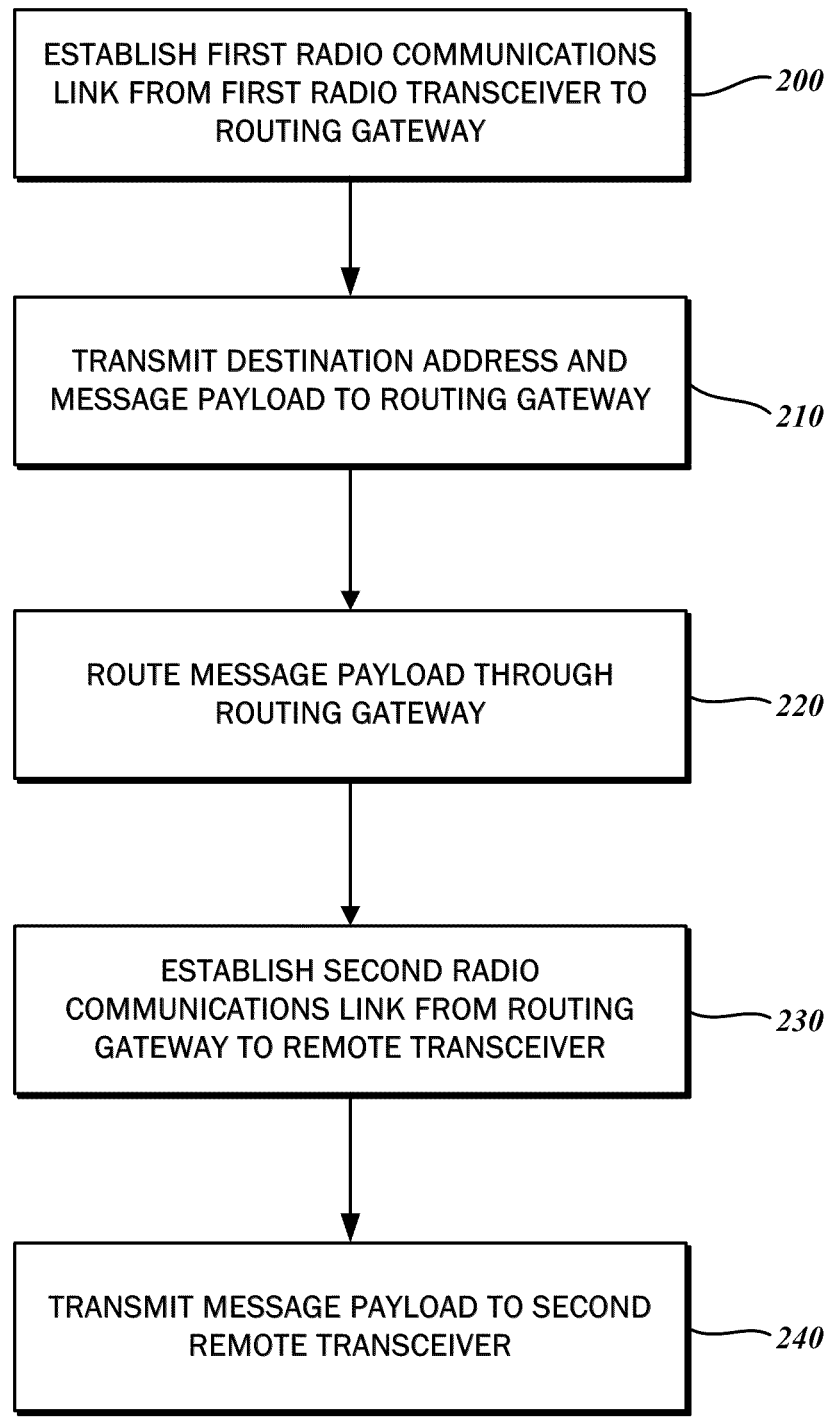
FIG. 3 is a flowchart illustrating a method for radio communications in accordance with another embodiment of the present invention.

Referring again to the flowchart of FIG. 3, the method for radio communications continues with a step 210 of transmitting the destination address 34 and a message payload to the routing gateway 38. As shown in the signal sequence diagram of FIG. 4, the identifier or address to which the voice call is to be routed is transmitted (310) to the routing gateway 38 after the radio preambles 305 complete transmission at the second time instance 355, completing at a third time instance 360. While one embodiment contemplates the transmission of just the destination address 34, other embodiments contemplate the transmission of the source address 28 as well, so that the routing gateway 38 and the destination transceiver unit 32 can identify it. Such identification functions will be described in further detail below.

Figure 5:
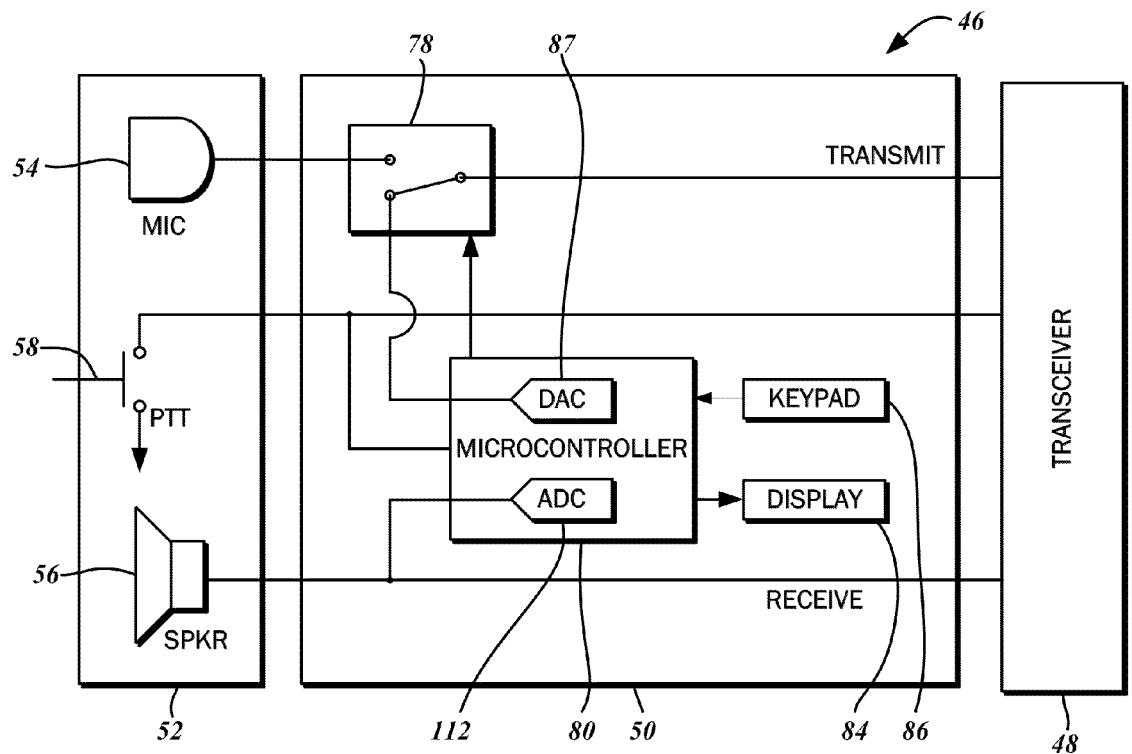
FIG. 5 is a block diagram of the transceiver units including a handset, a remote routing module, and a transceiver.

FIG. 5 illustrates the specific components that are understood to comprise the source transceiver unit 26 and the destination transceiver unit 32. As previously noted, the term "transceiver unit" is understood to generally encompass the wireless communications device utilized by the combat units 12 in the radio network system 10, while the more specific term "transceiver" refers to a subcomponent of the transceiver unit that is the underlying radio transmission and reception device. In this regard, a generic transceiver unit 46 is comprised of a transceiver 48, a remote routing module 50, and a handset 52. It is understood that the transceiver 48 is specific to the communications interlink 5 being handled thereby. For example, for the SINCGARS combat-net radio, the transceiver 48 may be a model RT-1523 from ITT Communications Systems of Fort Wayne, Ind.

In most cases, the handset 52 is not integrated into the transceiver 48. The handset 52, at its most basic form, includes a microphone 54 for converting audio into electrical signals capable of transmission and reproduction, as well as a speaker 56 for reproducing the audio from electrical signals representative thereof. Furthermore, as part of a push-to-talk radio communications system, the handset 52 also includes a push-to-talk button 58. The push-to-talk button 58 is a momentary pushbutton switch that takes the PTT input low when activated, as illustrated in the signal sequence diagram of FIG. 4.

Ignoring the remote routing module 50 for the moment, the microphone 54, the speaker 56, and the push-to-talk button 58 are connected to the transceiver 48. The transceiver 48 outputs an electrical signal representative of audio as demodulated from the received radio broadcast signal so long as the PTT input is detected to be high. When there is no handset 52 coupled to the transceiver 48, then the PTT input is open or undetermined, and defaults to PTT not being asserted. With the push-to-talk button 58 activated, the speaker 56 may be deactivated to prevent feedback, and the microphone 54 is activated to transmit electrical signals representative of the audio input to the transceiver 48. A more sophisticated push-to-talk system may be utilized in the handset 52 with, for example, voice activated type that automatically asserts PTT upon a threshold audio level input being detected. Those of ordinary skill in the art will recognize that the PTT button 58 is presented by way of example only, and any other modality by which PTT is asserted can be readily substituted without departing from the scope of the present invention.

Figure 6:
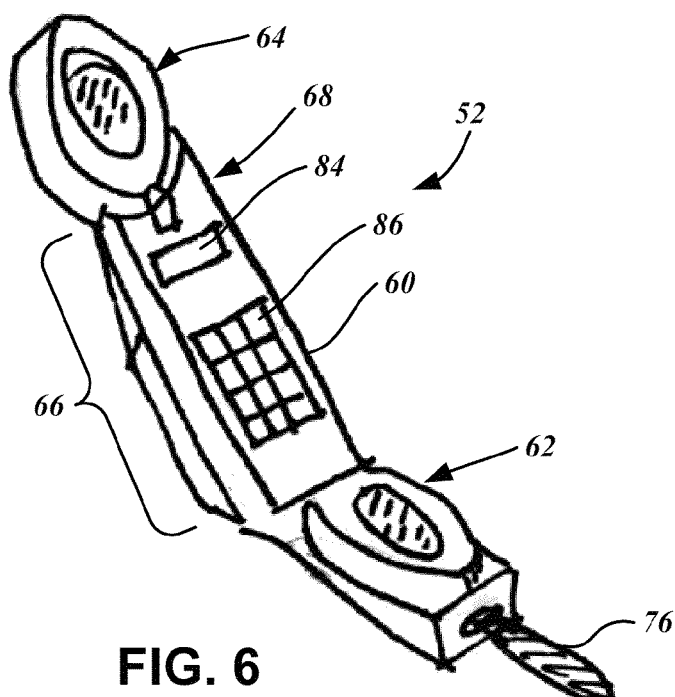
FIG. 6 is a front perspective view of a unitary body of the handset, as well as a display and keypad mounted therein.
Figure 7:
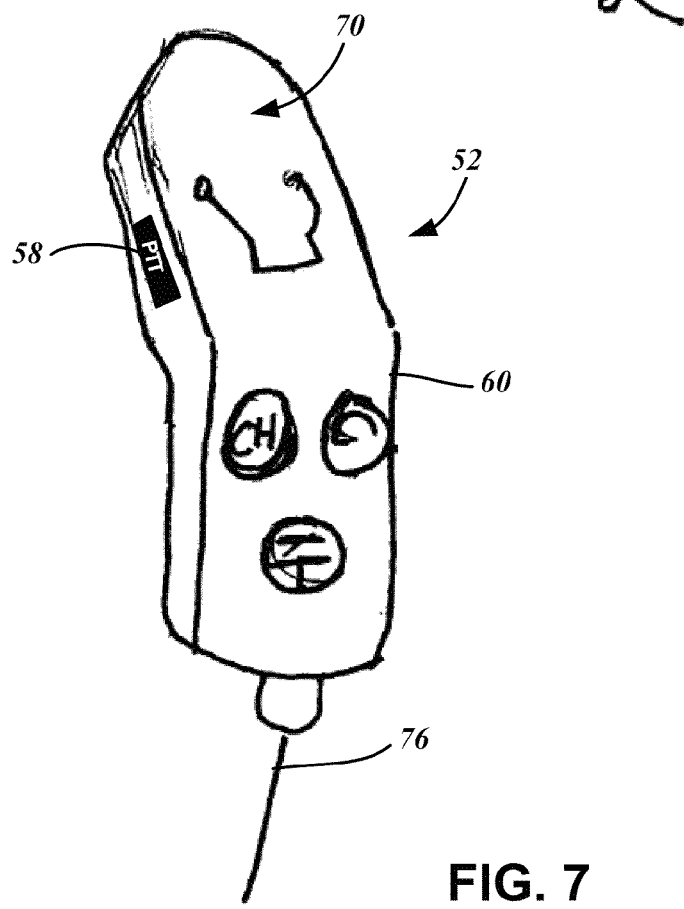
FIG. 7 is a rear perspective view of an exemplary handset with the transceiver module integrated therein.

With reference to FIGS. 6 and 7, one embodiment of the handset 52 is generally defined by a unitary body 60 with a microphone section 62, a speaker section 64, and a middle handle section 66. In this regard, it is understood that the handset 52 is shaped and configured in manner resembling conventional telephone handsets that anatomically correspond to a user's facial features, i.e., the speaker is positioned near the ear, and the microphone is positioned near the mouth, while the middle handle section 66 is understood to be grasped by a user's hand.

The body 60 houses the microphone 54, the speaker 56, and the push-to-talk button 58. More particularly, the microphone 54 is disposed in the microphone section 62 of the body 60, and the speaker 56 is disposed in the speaker section 64. A front face 68 of the unitary body 60 defines openings to the microphone 54 and the speaker 56. The push-to-talk button 58 is accessible from a rear face 70 of the unitary body 60, amongst other potential knobs and buttons.

As previously described, the handset 52, and in particular, the microphone 54, the speaker 56, and the push-to-talk button 58, are electrically connected to the transceiver 48. In this regard, the handset 52 includes a connecting cable 76 that includes each of the individual connections to the transceiver 48. It is envisioned that the connecting cable 76 is shielded from and for interference with other electronic devices in the vicinity.

Because of its anticipated use in rugged conditions, it is contemplated that the unitary body 60 is water, temperature, and shock resistant. The same considerations are understood to be applicable to the construction of the connecting cable 76. The exemplary handset 52 is only one of numerous variations of combined speaker and microphone devices that may be utilized, and other configurations such as hands-free headset types may be substituted. By way of example only and not of limitation, the transceiver 48 may interface with a data processing apparatus via the PTT, headphone and microphone connections.

Referring again to the block diagram of FIG. 5, it is contemplated that the remote routing module 50 is interposed between the headset 52 and the transceiver. As explained above, one embodiment of the present invention contemplates the transmission of the destination address 34 from the source transceiver unit 26 to the gateway 38 such that the voice call can then be directed to the destination transceiver unit 32. It is contemplated that the remote routing module 50 performs this signaling function.

The remote routing module 50 is understood to generally comprise a microphone enable switch 78 and a microcontroller 80, as well as other necessary circuitry. A numeric keypad 86 provides input to the microcontroller 80, and certain outputs from the microcontroller 80 are displayed on an LCD (liquid crystal display) device 84. As best illustrated in FIG. 6, the LCD device 84 and the numeric keypad 86 are accessible from the handset 60. According to one embodiment, the remote routing module 50 is integrated into either the handset 52 or the transceiver 48. Alternatively, and in particular for existing radio communication systems, the remote routing module 50 may be packaged separately and attached in-line between the handset 52 and the transceiver 48.

Per the signaling sequence discussed with reference to FIG. 4, once the push-to-talk button 58 is activated (300), the radio preamble is broadcast through the transceiver 48. Another of the inputs to the microcontroller 80 is the push-to-talk button 58, whereupon activation, a digital-to-analog converter (DAC) 87 is triggered to transmit the destination address 34 over the communications interlink 5 (310). Prior to this transmission, however, the microcontroller 80 receives the desired destination address 34 from the user via the keypad 86. Along these lines, the microcontroller 80 may include a memory device that stores the input data. For confirmation purposes, the entered destination address 34 may then be output to the LCD display 84.

The microcontroller 80 also detects when the transmission of the radio preambles (305) completes, or in the alternative, delays by an estimated length of time corresponding to typical time intervals required for the same. Thereafter, the microcontroller 80 signals the microphone enable switch 78 that connects the microphone input of the transceiver 48 to the output of the DAC 87. With the push-to-talk asserted, audio input to the transceiver 48 from the remote routing module 50 is broadcast. As will be appreciated, the microphone enable switch 78 permits only the connection of either the microphone 54 or the DAC 87 to the transceiver 48 at any given point in time, that is, both cannot be connected to the transceiver at the same time to prevent interference.

According to one embodiment of the present invention, the DAC 87 encodes the destination address 34 as a continuous audio signal. During transmission of the destination address 34, it is envisioned that in some embodiments, the audio signal is reproduced by the speaker 56 via radio sidetone. One of the encoding schemes is Frequency Shift Keying (FSK) on a carrier frequency in the audio range of 1200 Hz to 2400 Hz. Another of the contemplated schemes is a 2400 bps Amplitude Shift Keying/On-Off Keying (ASK/OOK). Essentially, the destination addressing/routing is completed through the voice channel, and those of ordinary skill in the art will recognize other possible signaling techniques that may be substituted. Further, while the above description mentions the transmission of only the destination address 34, it is expressly contemplated that the source address 28 assigned to the source transceiver unit 26 is also encoded and transmitted to the routing gateway 38 in the same manner as set forth above.

Figure 4:
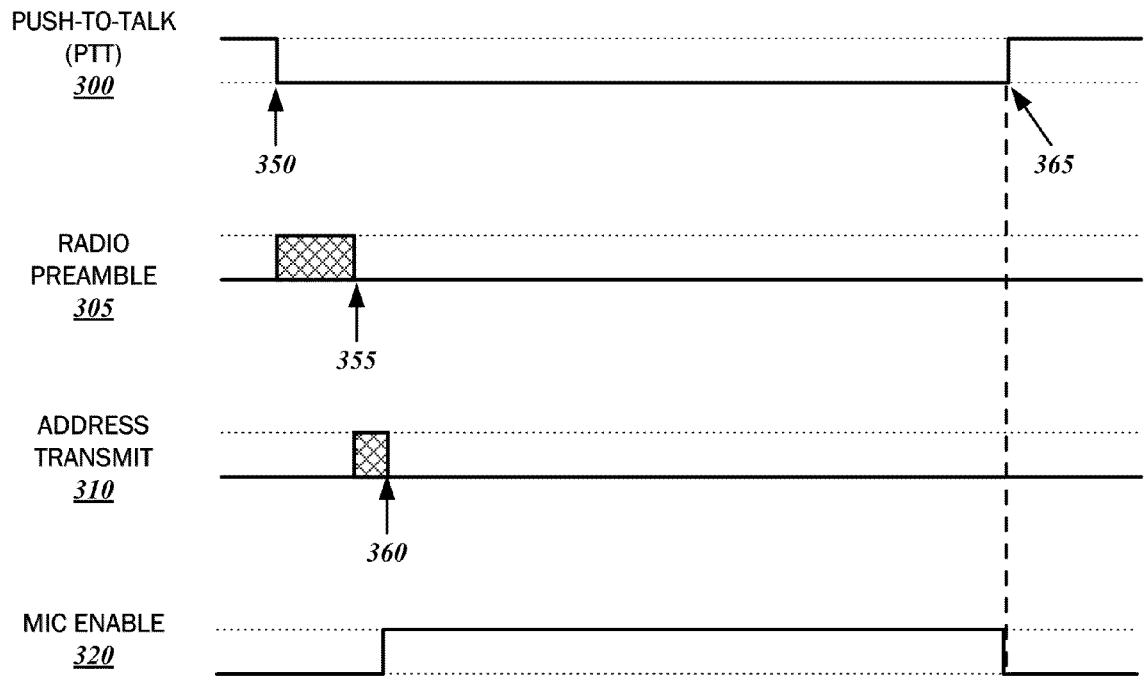
FIG. 4 a signal sequence diagram of communicating a voice message from the source transceiver unit to the gateway.

Referring again to the flowchart of FIG. 3 and the signal sequence diagram of FIG. 4, step 210 involves transmitting the message payload to the routing gateway 38. It is understood that the message payload refers to the audio from the microphone 54 captured after the microphone enable switch 78 is activated (320) at the third time instance 360 until push-to-talk is deactivated at the fourth time instance 365. The length of time between the third time instance 360 and the fourth time instance 365 is arbitrary, and depends solely on how long the push-to-talk button 58 is pressed. However, in some embodiments there may be certain limits imposed on the length of the message payload, as will be discussed in further detail below.

Figures 8, 9:
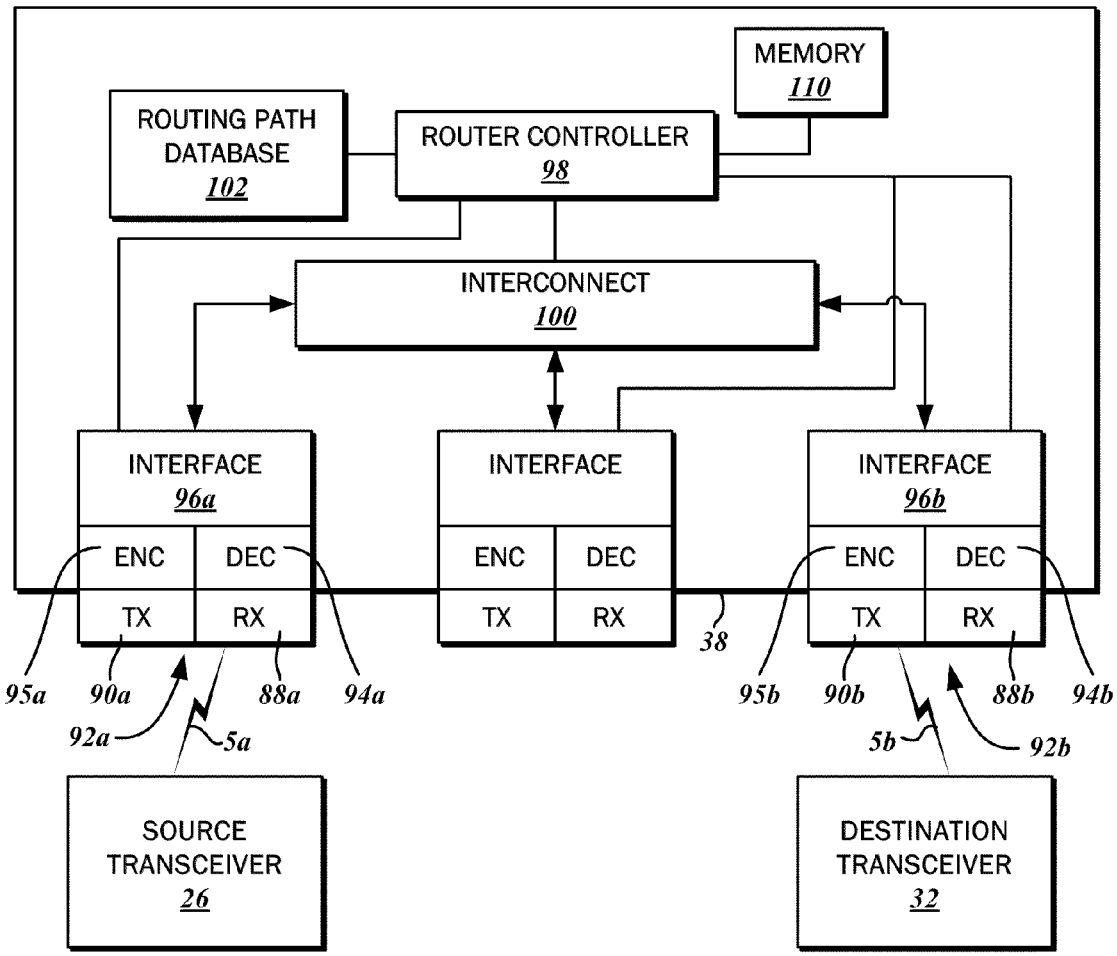
FIG. 8 is a block diagram of the components of the gateway, including a routing table, source receivers, destination transmitters, and router.
FIG. 9 is an exemplary routing path database in accordance with one embodiment of the present invention.

Referring now to FIG. 8, between the source transceiver 26 and the routing gateway 38, the radio communications link 5a is depicted as being established, which follows the assertion of push-to-talk and the transmission of the preambles. As explained above, the destination address 34 is then transmitted to the routing gateway 38 via the first communications interlink 5a to a first gateway receiver 88a. Additionally, a message payload is also transmitted in this manner. Although unused when receiving the broadcast from the source transceiver unit 26 there is a corresponding first gateway transmitter 90a, which, together with the first gateway receiver 88a, completes a first gateway transceiver 92a. Like the source transceiver unit 26, the gateway transceiver 92a is understood to conform to the particular communications system to which it relates. That is, if the source transceiver unit 26 is a SINC-GARS system device, then so is the gateway transceiver 92a with which it is communicating.

As shown in the flowchart of FIG. 3, the method for radio communications continues with a step 220 of routing the message payload through the routing gateway 38 to a gateway transmitter that is designated to communicate with the destination transceiver unit 32. The destination transceiver unit 32 is so designated because the destination address 34 transmitted by the source transceiver unit 26 is assigned thereto. In the example illustrated in FIG. 8, a second gateway transmitter 90b is in radio communication with the destination receiver 32 over the second communications interlink 5b. Furthermore, the second transmitter 90b is part of a second gateway transceiver 92b in combination with a second gateway receiver 88b.

It will be appreciated that many other gateway transceivers are operational in the routing gateway 38, each communicating with one or more remote transceivers. The present invention contemplates the connecting of the desired two remote transceivers over the routing gateway 38. Thus, in the context of the exemplary radio network system 10 illustrated in FIG. 8, one of the features of the routing gateway 38 is the connection of the first gateway transceiver 92a to the second gateway transceiver 92b. The additional components of the routing gateway 38 described in greater detail below will illustrate this feature.

After the first gateway receiver 88a receives the destination address 34 and the source address 28 as an audio signal, a first audio decoder 94a derives a digital numerical value therefrom. As explained above, various schemes may be utilized to convert between digital data and representative audio signals. In this regard, the first decoder 94a is almost identical in functionality to the DAC 86, except that its function is performed in reverse. It is also envisioned that the first decoder 94a is a companion device to a first encoder 95a that converts a digital numerical value to an audio signal, which is the reverse function of the first decoder 94a. There is an identical second decoder 94b and second encoder 95b associated with the second transceiver 92b. According to one embodiment, the addressing data transmitted from the routing gateway 38 to the destination transceiver unit 32 is generally informational only though in some embodiments the source address 28 may be utilized to output only select transmissions. Further details regarding these features will be set forth more fully below.

Collectively, the gateway transceiver 92 and the encoder/decoder 94, 95 are referred to as an interface 96, specifically a first interface 96a and a second interface 96b. The interface 96 is understood to be specific to the communications interlink 5a, and may be referred to as, for example, a SINCGARS interface or a AN/PRC interface according to its underlying telecommunications system.

The destination address 34, which is now represented as a series of binary digits, is then processed by a router controller 98 that directs the proper connections to be made on a switchboard-like interconnect 100. With further particularity, the router controller 98 consults a routing path database 102 to determine which interfaces 96 are to be interconnected. In other words, the destination address/interface pairings specified in the routing path database 102 are activated by the router controller 98. Thus, it is understood that the selectable interconnection between the interfaces 96 are defined by the routing path database 102.

The exemplary table of FIG. 9 representing the routing path database 102 includes a number column 104, a user column 106, and an interface designation column 108. It is contemplated that the number column 104 stores the numeric addresses of the transceiver units on the radio network system 10, while the interface designation column 108 specifies the interface with which the corresponding remote transceiver with that address is associated.

By way of example, and with additional reference to the block diagrams of FIG. 2 and FIG. 8, a call is placed for the destination transceiver unit 34 that has an address "546-8121." "Placing a call" is understood to refer to the source transceiver unit 26 transmitting a destination address of "546-8121" to the first gateway receiver 88*a* and related steps. The router controller 98 then retrieves the corresponding interface (second row of column 108 of routing path database 102), which is defined as "AN/PRC" and directs the interconnect 100 to link the first interface 96*a* to the second interface 96*b*. It is understood, then, that the exemplary second interface 96*b* is an "AN/PRC" telecommunications system. In another example, it is contemplated that where the destination transceiver unit 34 is a Voice over IP system, then the destination address may be an Internet Protocol (IP) address.

According to another embodiment of the present invention, besides routing calls to the destination transceiver unit 34, the routing gateway 38 may provide additional functionality such as transmitting further identifying information to the transceiver unit 34. For example, the user column 106 stores the corresponding user names associated with the address. The second interface 96*b* may be provided with the user name of the source transceiver 26, which is "Jenny" in the exemplary routing path database 102. This data is likewise encoded by the second gateway encoder 95*b* as an audio signal for transmission to the destination receiver 32. It is understood that the router controller 98 looks up this information from the routing path database 102.

Shortly after the destination address 34 is transmitted to the gateway, the source transceiver unit 26 begins transmitting the message payload to the first gateway receiver 88*a*. In accordance with one embodiment of the present invention, as the message payload is received, it is being stored in a memory device 110. Once the proper connections have been made in the interconnect 100, the router controller 98 may retrieve the message payload from the memory device 110 for transmission to the destination receiver unit 32 via the destination interface 96*b*. In this regard, some embodiments contemplate the memory device 110 being closely tied to or integrated with the router controller 98 or interconnect 100. Those having ordinary skill in the art will recognize, however, that the memory device 110 is not a necessity, and other techniques to delay the delivery of the message payload while the proper linkages are being made by the router controller 98 in the interconnect 100 are also contemplated.

Referring again to the flowchart of FIG. 3, the method in accordance with one embodiment of the present invention continues with a step 230 of establishing a second communications interlink 5*b* between the second gateway transmitter 90*b* and the destination transceiver unit 32. As explained in relation to the first communications interlink 5*a* above, the second communications interlink 5*b* is based on a radio broadcast and reception. Accordingly, it is understood to be a "stateless" connection that is established at the transmission and receipt of a signal. It will be appreciated that substantially the same transmission sequence discussed above with reference to the diagram of FIG. 4 will be utilized, though it is contemplated that additional metadata may be incorporated into the transmission of the address or identifier (310). Additionally, it is understood that the MIC enable segment 320 will be the transmission of the message payload, which will have the same content as that input on the source transceiver unit 26.

The method concludes with a step 240 of transmitting the message payload to the destination transceiver unit 32 and receipt thereby. Referring again to the block diagram of FIG. 5, all audio transmissions after the radio preamble (305) are output from the transceiver 48 to the remote routing module 50 and the handset 52. The output from the transceiver unit 32 includes the address/identifier transmissions (310) as well as the message payload. An Analog-to-Digital Converter (ADC) 112 of the microcontroller 80 listens to all of the audio output, which may include an encoded destination address 34, a source address 28, or a user name connected therewith. It is understood that the same decoding scheme as the encoding scheme implemented by the second encoder 95*b* is deployed by the ADC 112. As previously described, such encoding schemes include FSK and ASK/OOK, among other techniques. Upon being decoded, the source address 28 and/or the user name associated therewith is shown on the display 84. It will be appreciated that an immediate visual identification of the incoming call is possible, without the necessity of including and listening for voice identifiers when the message payload is replayed. The remainder of the transmission from the second interface 96*b*, that is, the message payload, is output to the speaker 56.

It is also envisioned that if the combat unit 12 using the destination transceiver unit 32 desires to transmit a response message, the same steps as described above in relation to the source transceiver unit 26 is performed. Specifically, the second communications interlink 5*b* is established, and the address associated with the destination transceiver unit 32 is transmitted to the routing gateway, as before. In this instance, however, the destination address 34 and the source address 28 is reversed; the destination transceiver unit 32 and the source transceiver unit 26 reverses roles. According to one contemplated embodiment, once the source address 28 is received by the destination transceiver unit 32, it is by default recorded as the destination address for its next outgoing transmission. It is also contemplated that the routing gateway 38 maintains a log of the destination and source addresses from various interconnections and routes all transmissions from the destination transceiver unit 32 automatically to the first interface 96*a* if it occurs within a preset timeout interval, or unless a new destination is keyed in and received.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

What is claimed is:

1. A radio network system comprising:
    a plurality of source transceiver units, each of the source transceiver units having an assigned source address and being operative to transmit an encoded source transceiver output signal, the source transceiver output signal including a destination address and a message payload;
    a plurality of destination transceiver units, each of the destination transceiver units having an assigned destination address;
    a router gateway having a first interface in radio communication with at least one source transceiver unit, and a second interface in radio communication with at least one destination transceiver unit;
    the router gateway including at least one decoder for decoding the source transceiver output signal and deriving the included destination address therefrom;
    the decoder further decoding the source transceiver output signal and deriving the included message payload;

the router gateway further including a plurality of encoders, each of the encoders being associated with a dedicated destination transceiver unit, and each of the encoders being operative to encode the decoded message payload into a format suitable for communication to the dedicated destination transceiver unit; and the router gateway further containing a routing path database operative to map the decoded source transceiver output signal to an encoder dedicated to a destination transceiver unit.

2. The radio network system of claim 1, wherein the source and destination transceiver units both include:
an input keypad for entering the destination address; and
an output screen for displaying the destination address and the source address.

3. The radio network system of claim 1, wherein the message payload includes at least one audio message, and wherein the router gateway further includes:
a memory device for storing the at least one audio message received from the source transceiver unit, the audio message being retrievable from the memory device for transmission to the destination transceiver unit.

4. The radio network system of claim 1, wherein the radio communication between the source transceiver unit and the router gateway is implemented in a format selected from a group consisting of Very High Frequency (VHF) radio format, Single Channel Ground and Airborne Radio System (SINCGARS) format, LINK-16 format, and Code Division Multiple Access (CDMA) format.

5. The radio network system of claim 4, wherein the radio communication between the router gateway and the destination transceiver unit is implemented in a format selected from a group consisting of: Very High Frequency (VHF) radio format, Single Channel Ground and Airborne Radio System (SINCGARS) format, LINK-16 format, and Code Division Multiple Access (CDMA) format.

6. The radio network system of claim 5, wherein the communication between the source transceiver unit and the router gateway is in a format different from the communication between the router gateway and the destination transceiver unit.

7. The radio network system of claim 1, wherein the source transceiver unit includes:
a routing module comprising a microcontroller;
the microcontroller being operative to receive the desired destination address from the user via a keypad input in communication therewith;
the microcontroller further comprising a digital-to-analog converter, wherein the digital-to-analog converter converts the digital destination address to analog signal, and wherein the digital-to-analog converter is operative to transmit the analog destination address to the transceiver, and wherein the transceiver is operative to transmit signals to the router gateway;
the routing module being coupled to a push-to-talk button, the digital-to-analog converter being triggered to transmit the destination address to the transceiver in response to the operation of the push-to-talk button;
the routing module further comprising a microphone enable switch, the microphone enable switch being activated after transmission of the destination address to the gateway.

8. The radio network system of claim 1, wherein the decoder is an audio decoder.

9. The radio network system of claim 1, wherein the message payload includes an audio signal.

10. The radio network system of claim 1, wherein the routing path database associates the destination address to a unique remote destination transceiver unit.

11. A method of radio communication between first and second remote transceivers, comprising:
establishing a first radio communication link between the first remote transceiver and a gateway;
receiving a first radio input signal from the first remote transceiver at the gateway, the first radio input signal including a destination identifier and a message payload;
decoding the first radio input signal to derive the destination identifier and the message payload, the destination identifier identifying the second remote transceiver;
routing the message payload through the gateway to an encoder dedicated to the second remote transceiver;
encoding the message payload; and
transmitting the encoded message payload to the second remote transceiver over a second radio communication link.

12. The method for radio communications of claim 11, wherein the first radio input signal further includes a source identifier, the source identifier being associated with the first remote transceiver.

13. The method for radio communications of claim 12, further comprising:
receiving a responsive secondary input signal over the second radio communication link from the second remote transceiver, the responsive secondary input signal including a response message payload;
routing the response message payload through the gateway to an encoder dedicated to the first remote transceiver, as identified by the source identifier;
encoding the response message payload; and
transmitting the encoded response message payload over the first radio communication link.

14. The method for radio communications of claim 12, further comprising:
displaying the source identifier on an output of the second remote transceiver.

15. The method for radio communications of claim 11, wherein the decoded message payload is an audio signal.

16. The method for radio communications of claim 11, wherein the first radio communication link is in a format selected from a group consisting of: Very High Frequency (VHF) radio format, Single Channel Ground and Airborne Radio System (SINCGARS) format, LINK-16 format, and Code Division Multiple Access (CDMA) format.

17. The method for radio communications of claim 16, wherein the second radio communication link is in a format selected from a group consisting of: Very High Frequency (VHF) radio format, Single Channel Ground and Airborne Radio System (SINCGARS) format, LINK-16 format, and Code Division Multiple Access (CDMA) format.

18. The method for radio communications of claim 17, wherein the first radio communication link supports radio communication in a format different from the format supported by the second radio communication link.

19. A network gateway for routing transmissions from a remote source transceiver unit to a remote destination transceiver unit, the destination unit being identified by a unique destination address, the gateway comprising:
a plurality of gateway receivers, at least one of the gateway receivers being in communication with a remote source transceiver unit and operative to receive a source transceiver output signal therefrom, the source transceiver output signal including at least a message payload and a destination address;

a plurality of gateway transmitters, at least one of the gateway transmitters being in communication with the remote destination transceiver unit identified by the destination address;

a routing path database operative to map at least one of the gateway transmitters to a dedicated destination transceiver unit;

a router for selectively routing the message payload a gateway transmitter associated with a destination transceiver unit identified by the destination address.

20. The network gateway of claim 19, further comprising a decoder in communication with the gateway receiver and operative to decode the transceiver unit output signal to derive the message payload and the destination address therefrom.

21. The network gateway of claim 20, further comprising an encoder in communication with the gateway transmitter and operative to encode the message payload for transmission to the remote destination transceiver unit.

22. The network gateway of claim 21, wherein the gateway transmitters and the gateway receivers support radio communication formats selected from a group consisting of: Very High Frequency (VHF) radio format, Single Channel Group and Airborne Radio System (SINCGARS) format, LINK-16 format, and Code Division Multiple Access (CDMA) format.

23. The network gateway of claim 22, wherein the interconnection is established between gateway receivers supporting one type of radio communication format and gateway transmitters supporting another type of radio communication format incompatible with the first type mentioned therein.

24. The network gateway of claim 22, wherein the plurality of gateway receivers is in communication with only one of the plurality of source transceiver units.

25. The network gateway of claim 23, wherein the plurality of gateway transmitters is in communication with only one of the plurality of destination transceiver units.

* * * * *